US012785443B2

(12) United States Patent
Bianchi et al.

(10) Patent No.: US 12,785,443 B2
(45) **Date of Patent: *Nov. 3, 2026**

(54) CONTROL UNIT FOR AN ELECTRICAL CIRCUIT BREAKER AND ASSOCIATED ELECTRICAL CIRCUIT BREAKER

(71) Applicant: Schneider Electric Industries SAS, Rueil-Malmaison (FR)

(72) Inventors: Thomas Bianchi, Grenoble (FR); Patrick Prieur, Claix (FR)

(73) Assignee: SCHNEIDER ELECTRIC INDUSTRIES SAS, Rueil-Malmaison (FR)

( * ) Notice: Subject to any disclaimer, the term of this patent is extended or adjusted under 35 U.S.C. 154(b) by 6 days.

This patent is subject to a terminal disclaimer.

(21) Appl. No.: 19/089,181

(22) Filed: Mar. 25, 2025

(65) Prior Publication Data

US 2025/0309682 A1 Oct. 2, 2025

(51) Int. Cl.

*H02J 13/34* (2026.01)
*H01H 71/02* (2006.01)
*H01H 71/04* (2006.01)

(52) U.S. Cl.

CPC ......... *H02J 13/34* (2026.01); *H01H 71/0207* (2013.01); *H01H 71/0264* (2013.01); *H01H 71/04* (2013.01)

(58) Field of Classification Search

CPC . H02J 13/34; H01H 71/0207; H01H 71/0264; H01H 71/04; H01H 71/0228; H01H 9/167; H01H 71/12; H01H 71/025

(Continued)

(56) References Cited

U.S. PATENT DOCUMENTS 5,426,406 A * 6/1995 Morris .................... H01H 9/10 335/8
5,877,691 A 3/1999 Suptitz et al.

(Continued)

FOREIGN PATENT DOCUMENTS

DE 102011088743 A1 6/2013
EP 0843332 A1 5/1998

(Continued)

OTHER PUBLICATIONS

French Search Report dated Sep. 27, 2024 for corresponding French Patent Application No. 2403188, 2 pages.

*Primary Examiner* — Omar Casillashernandez
(74) *Attorney, Agent, or Firm* — Quinn IP Law

(57) ABSTRACT

This control unit (20) comprises a casing (30) defining a front plane (P22) where a housing (401), configured to receive a communication module (400) in an assembled position, opens. Contact pads (36) are arranged at the bottom of the housing recessed from the front plane (P22), so that a clearance distance between each contact pad and the front plane is greater than a class 2 isolation distance, according to the IEC 947-1:2019 standard, under a voltage greater than 690 V. The communication module comprises an envelope (410), which delimits a cavity (411), configured to receive a wireless communication card (414) and which in an assembled position of the casing, closes the housing, so that a creepage distance between each contact pad and the front plane is greater than a class 2 isolation distance under a voltage greater than 690 V according to the IEC 947-1:2019 standard.

8 Claims, 5 Drawing Sheets

(58) Field of Classification Search
USPC .......................................................... 340/635
See application file for complete search history.

(56) References Cited

U.S. PATENT DOCUMENTS

| | | | | |
|---|---|---|---|---|
| 10,908,215 | B2 * | 2/2021 | Martin | H01B 1/026 |
| 2010/0259869 | A1 * | 10/2010 | Bonfanti | H02B 11/28<br>361/608 |
| 2018/0059185 | A1 | 3/2018 | Martin et al. | |
| 2025/0029795 | A1 * | 1/2025 | Hu | H01H 9/542 |

FOREIGN PATENT DOCUMENTS

| | | | |
|---|---|---|---|
| EP | 3290935 | A1 | 3/2018 |
| FR | 2703506 | A1 | 10/1994 |
| FR | 2994345 | A1 | 2/2014 |

* cited by examiner

CONTROL UNIT FOR AN ELECTRICAL CIRCUIT BREAKER AND ASSOCIATED ELECTRICAL CIRCUIT BREAKER

The present invention relates to a control unit for an electrical circuit breaker, as well as an electrical circuit breaker including such a control unit.

The present invention relates to a control unit for an electrical circuit breaker, as well as an electrical circuit breaker including such a control unit.

It is known, particularly from EP-0 843 332-A1, electrical circuit breakers including a breaker unit and an electronic control unit. Such a control unit is typically configured to measure, in real-time, the operating state of the circuit breaker and to command the opening of the breaker unit in case of a malfunction of the circuit breaker. The control unit is reversibly received in a receptacle provided in the breaker unit and is located on a front face of the circuit breaker, so that a user can read and/or adjust certain operating parameters of the electrical circuit breaker. The control unit is removable, so that a user can replace the control unit in case of malfunction, without having to disconnect the breaker unit from the rest of the electrical installation.

According to the applications, the electrical circuit breaker operates under voltages of several hundred or even thousands of Volts, and under currents up to several thousand Amperes. The electrical circuit breaker in general, and the control unit in particular, must present sufficient electrical isolation to ensure the safety of people. For example, the IEC 947-1:2019 standard—tables 13 and 15—defines isolation classes, which correspond to minimum distances to be respected between electrified points—or likely to be electrified—and the user. The isolation distances depend, in particular, on the isolation class sought, and the electrical voltage under which the electrical circuit breaker operates. In the IEC 947-1:2019 standard, mainly two voltage ranges are considered, with a first range corresponding to a voltage less than or equal to 690 V, and a second range corresponding to a voltage strictly greater than 690 V. As an example, for a voltage greater than 690 V, class 1 isolation requires a clearance distance greater than 7 mm, and creepage distances greater than 10 mm. Class 2 isolation doubles these distances. For a voltage less than 690 V, class 2 isolation requires a clearance distance greater than 10 mm.

With the evolution of technologies and needs, it is advantageous to propose, if needed, a communication interface, in particular, a wired or wireless interface, so that the user can transfer data from and/or to the control unit.

But, a wireless communication interface requires the presence of an antenna, which must be placed in front of the circuit breaker in order to operate in a satisfactory manner. It is known to connect to the control unit an external communication unit, which comprises a casing receiving the antenna, and a connection cable, which is connected to the control unit from the rear, whereas the casing is fixed to the front face of the circuit breaker. Such a solution is not practical, as it requires the control unit to be removed from its receptacle to make the connection. Furthermore, the casing fixed to the circuit breaker is bulky and risks being damaged.

The invention particularly aims to address these needs by proposing a modular control unit that allows, if needed, the installation of a communication module, without having to extract the control unit from the receptacle provided in the control unit, while ensuring the protection of people.

To this end, the invention relates to a control unit for an electrical circuit breaker, the control unit comprising:

- a front face, which presents a generally flat shape and is geometrically carried by a front plane, the front face being orthogonal to a depth axis and defining a forward direction oriented toward the user when the control unit is in a normal use configuration,
- a casing, which is made of an insulating material and which delimits a housing, the housing being provided, recessed from the front plane and opening onto the front face, a printed circuit board, which comprises at least one connection zone, with one or more juxtaposed electrical contact pads, the connection zone being located in the housing,
- a communication module, which comprises an envelope delimiting a cavity, the cavity being configured to receive a wireless communication card, comprising an antenna and complementary connectors, the envelope being made of an electrically insulating material and being configured to be reversibly received in the housing, the envelope of the communication module being in an assembled configuration, wherein:

- each contact pad is located recessed from the front plane and is spaced away from the front plane by a distance, measured according to the depth axis, greater than a predetermined first threshold,
- the first threshold is chosen so that a clearance distance between each contact pad and the front plane is greater than a class 2 isolation distance under a voltage greater than 690 V, the clearance distance and the class 2 isolation distance being according to the IEC 947-1:2019 standard, and
- when the envelope is in the assembled position, the envelope at least partially closes the housing, so that a creepage distance between each contact pad and the front plane is greater than a second predetermined threshold, the second threshold being equal to a class 2 isolation distance under a voltage greater than 690 V, according to the IEC 947-1:2019 standard.

Thanks to the invention, the communication module can be easily installed from the front of the control unit, without having to remove the control unit from the breaker unit. The electrical contact pads are all arranged recessed from the front face, which ensures a sufficient isolation distance, when the envelope of the communication module is mounted on the control unit casing, whether the communication card is present or not. Thus, once installed, the communication module does not increase the footprint of the control unit, which thus remains compact.

According to advantageous but non-mandatory aspects of the invention, such a control unit may incorporate one or more of the following features taken in isolation or in any technically permissible combination:

- The first threshold is greater than or equal to 14 mm.
- Each envelope comprises a proximal wall, which is generally orthogonal to a main axis, and a peripheral wall, which extends in projection from the proximal wall, and which presents a continuous contour around the main axis, the proximal wall and the peripheral wall together delimiting the cavity of the envelope, the cavity opening from the envelope through a distal opening, which is located opposite the proximal wall according to the main axis,
- whereas, when the communication module is in an assembled configuration, the main axis is parallel to the depth axis, while the distal opening is oriented toward the corresponding connection zone, the cavity masking the contact pads according to the depth axis, The second threshold is equal to 20 mm.

The communication module comprises the communication card which is received in the cavity.

The communication module comprises at least one complementary contact, which is made of metal, which is partially received in the cavity, and which protrudes outside the envelope by the distal opening, whereas each complementary contact is configured to be reversibly connected to a respective electrical contact pad of the housing when the communication module is in an assembled configuration.

The invention also relates to an electrical circuit breaker, comprising:

a breaker unit, comprising at least one breaker device and an actuator, the breaker device being triggerable by means of the actuator, one example of the control unit such as described above, wherein:

the breaker unit provides a receptacle, which opens onto a front face of the breaking unit, the control unit is received in the receptacle of the breaker unit, so that the front face of the control unit is substantially aligned with the front face of the breaker unit.

Advantageously:

the breaker unit comprises a cover, which is removable from the rest of the breaker unit, which is made of an electrically insulating material, and which defines a portion of the frontal face of the breaker unit, the communication housing is a frontal housing, which is arranged at the edge of the front face, while the communication module presents a recess, which is located recessed from the front plane, when the control unit is received in the receptacle of the breaker unit and the cover is mounted on the breaker unit, the cover at least partially covers the recess, so as to prevent the removal of the communication module from the rest of the control unit.

The invention will be better understood, and other advantages thereof will appear more clearly in the light of the following description of one embodiment of a control unit and an electrical circuit breaker, in accordance with its principle, given solely by way of example and made with reference to the appended drawings, in which:

FIG. 1 respectively represents, in two inserts a) and b), a perspective view and a partially exploded perspective view of an electrical circuit breaker in accordance with the invention, the electrical circuit breaker comprising a control unit, also in accordance with the invention;

Figure 1:
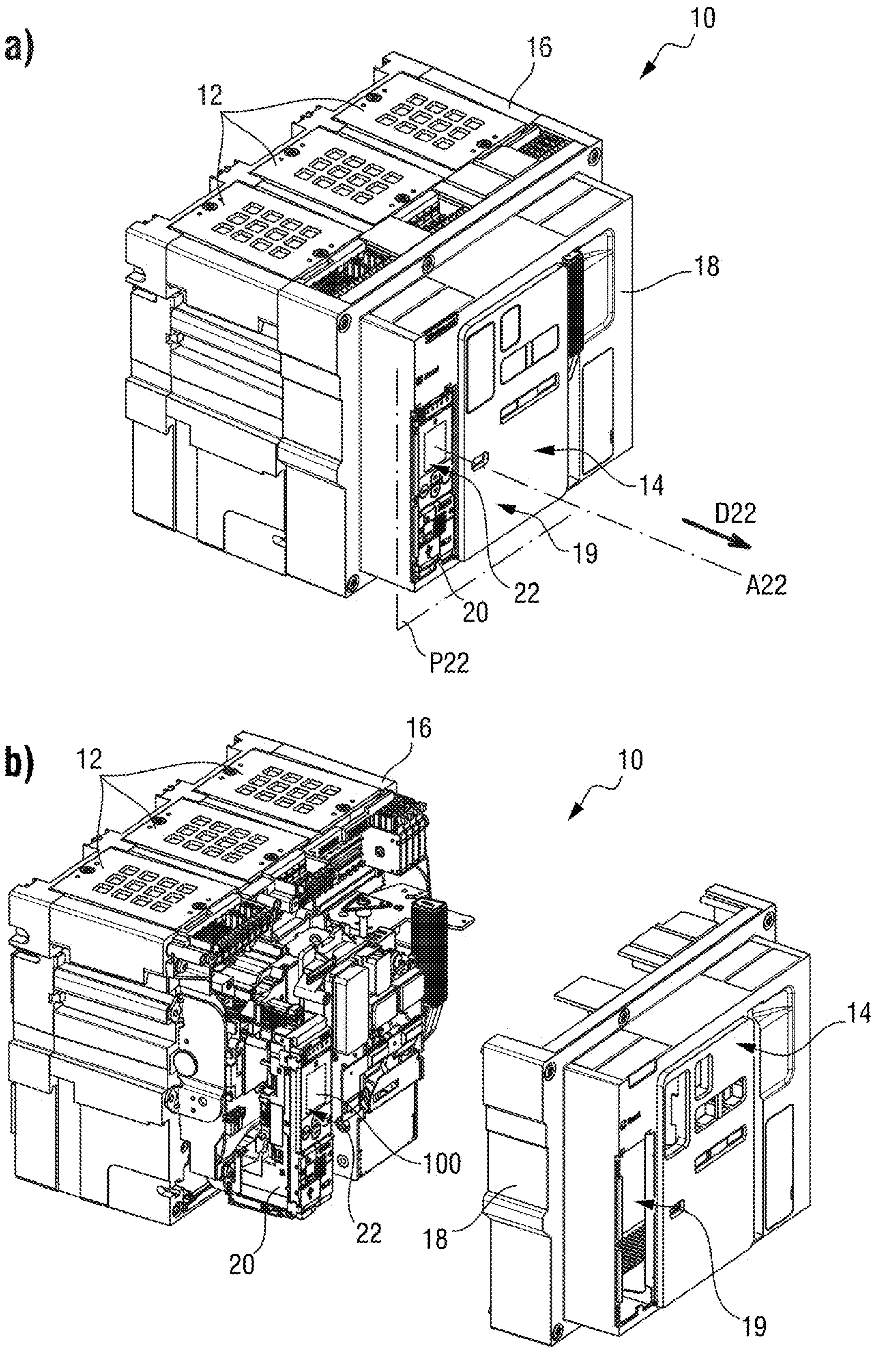
Figure 5:
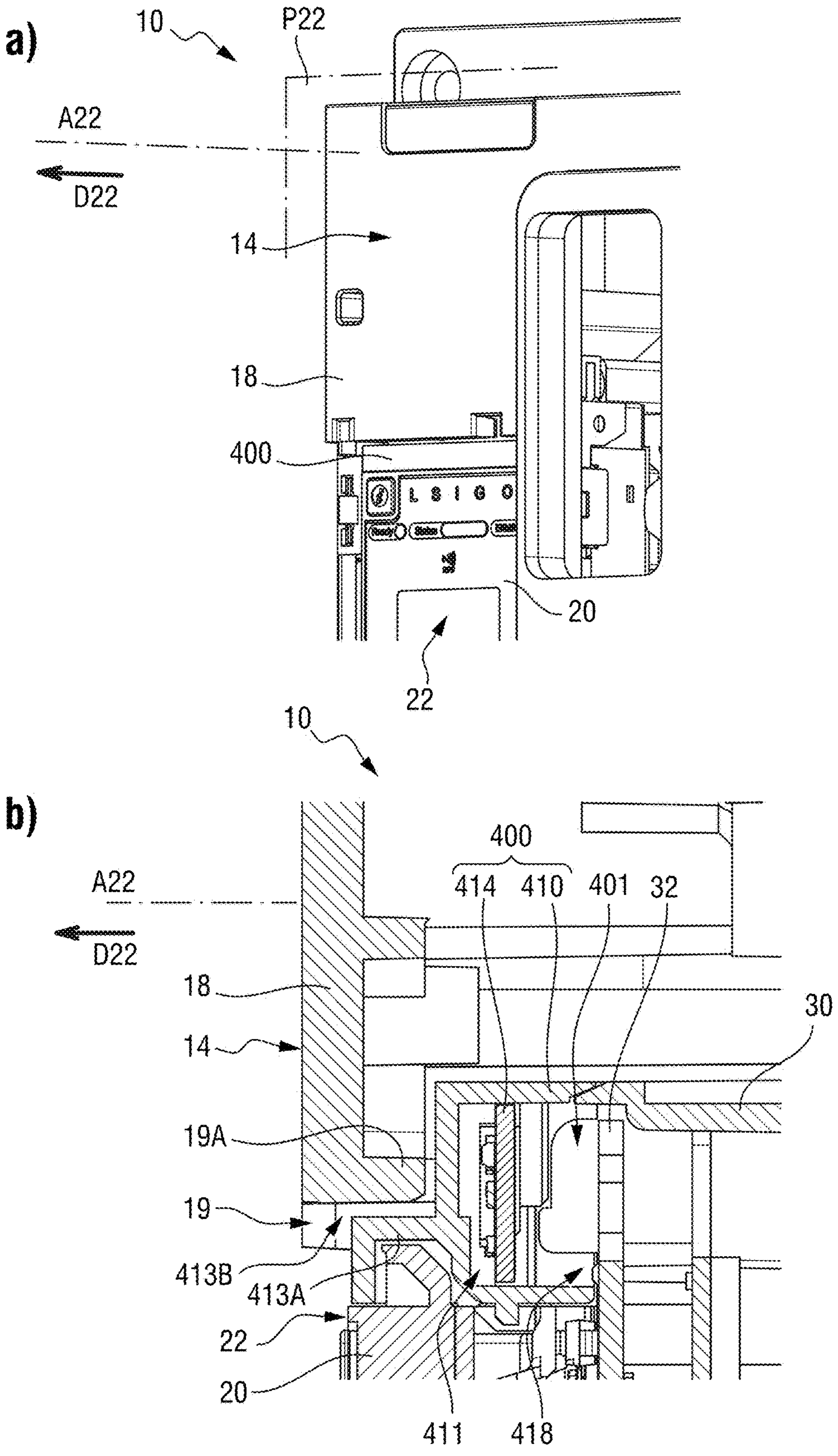

FIG. 5 respectively represents, in two inserts a) and b), a perspective view and a section of the electrical circuit breaker of FIG. 1, some pieces being hidden.

An electrical circuit breaker 10 is represented in FIG. 1. The electrical circuit breaker 10, also simply called circuit breaker 10, is here a multipole circuit breaker, in particular a triple pole circuit breaker. The number of poles of the circuit breaker 10 is not limiting. In a known manner, a multipole electrical circuit breaker includes, for each electrical pole, input, and output power terminals, which are respectively connected or electrically isolated from each other by a breaker device of the circuit breaker. The breaker device comprises, for example, separable movable contacts, which are received in a breaker chamber of the electrical circuit breaker 10 and the movements of which are controlled by an actuator. Thus, the breaker device is triggerable by the actuator. The breaker chambers are here materialized by three grids 12 visible on an upper face of the circuit breaker 10, the other elements of the breaker device not being represented.

The electrical circuit breaker 10 is intended to be used within an electrical installation, for example to control the power supply of a machine tool. In a normal use configuration, the electrical circuit breaker 10 is generally placed within an electrical cabinet, the electrical circuit breaker 10 presenting a front face 14, which is oriented toward the user standing in front of the electrical cabinet. The electrical cabinet is not represented.

The electrical circuit breaker 10 comprises a breaker unit 16, which in particular includes each of the breaker chambers, as well as the breaker device and the associated actuator.

The electrical circuit breaker 10 advantageously comprises a cover 18, which is removable from the rest of the breaker unit 16. The cover 18 is made of an electrically insulating material and extends generally according to a frontal plane P14, which delimits a portion of the frontal face 14 of the electrical circuit breaker 10, and by extension of the breaker unit 16. The cover 18 thus serves to protect the user from the circuit breaker 10. In FIG. 1 *a*), the cover 18 is represented assembled to the breaker unit 16, which corresponds to a normal use configuration of the circuit breaker 10. In FIG. 1 *b*), the cover 18 is spaced away from the breaker unit 16, this configuration being found, for example, during maintenance of the breaker unit 16.

The electrical circuit breaker 10 also comprises a control unit 20. The control unit 10 is configured to analyze the states of the breaker unit 16 and is configured to trigger the actuator based on the results of these analyses, thus separating the separable contacts.

The control unit 20 comprises a front face 22. The front face 22 presents a generally flat shape and is geometrically carried by a front plane P22, which is orthogonal to a depth axis A22 of the control unit 20. The front face 22 is oriented toward the user when the control unit 20 is in a normal use configuration. The front face 22 thus defines a forward direction D22, which is parallel to the depth axis A22. The forward direction D22 is represented by an arrow. The notions of directions such as "forward," "backward," "up," "down," etc., are defined in relation to the elements such as represented in the drawings, knowing that it may be otherwise in reality.

The cover 18 comprises a window 19, through which the front face 22 of the breaking unit 20 is visible. The window 19 is preferably closed by a transparent flap. The flap is not represented.

The control unit 10 is assembled to the breaker unit 16 in a reversible manner. In the example of FIGS. 1*a*) and 1*b*), the control unit 20 is represented in an assembled configuration to the breaker unit 16. The control unit 20 is represented in isolation in FIG. 2.

The breaker unit 16 provides a receptacle, which opens onto a frontal face 14 of the breaker unit 16 and in which the control unit 20 is received, so that the front face 22 of the control unit 20 is substantially aligned with the frontal face 14 of the breaker unit 16, as illustrated in particular in FIG. 1 *a*). The receptacle is not represented.

Figure 2:
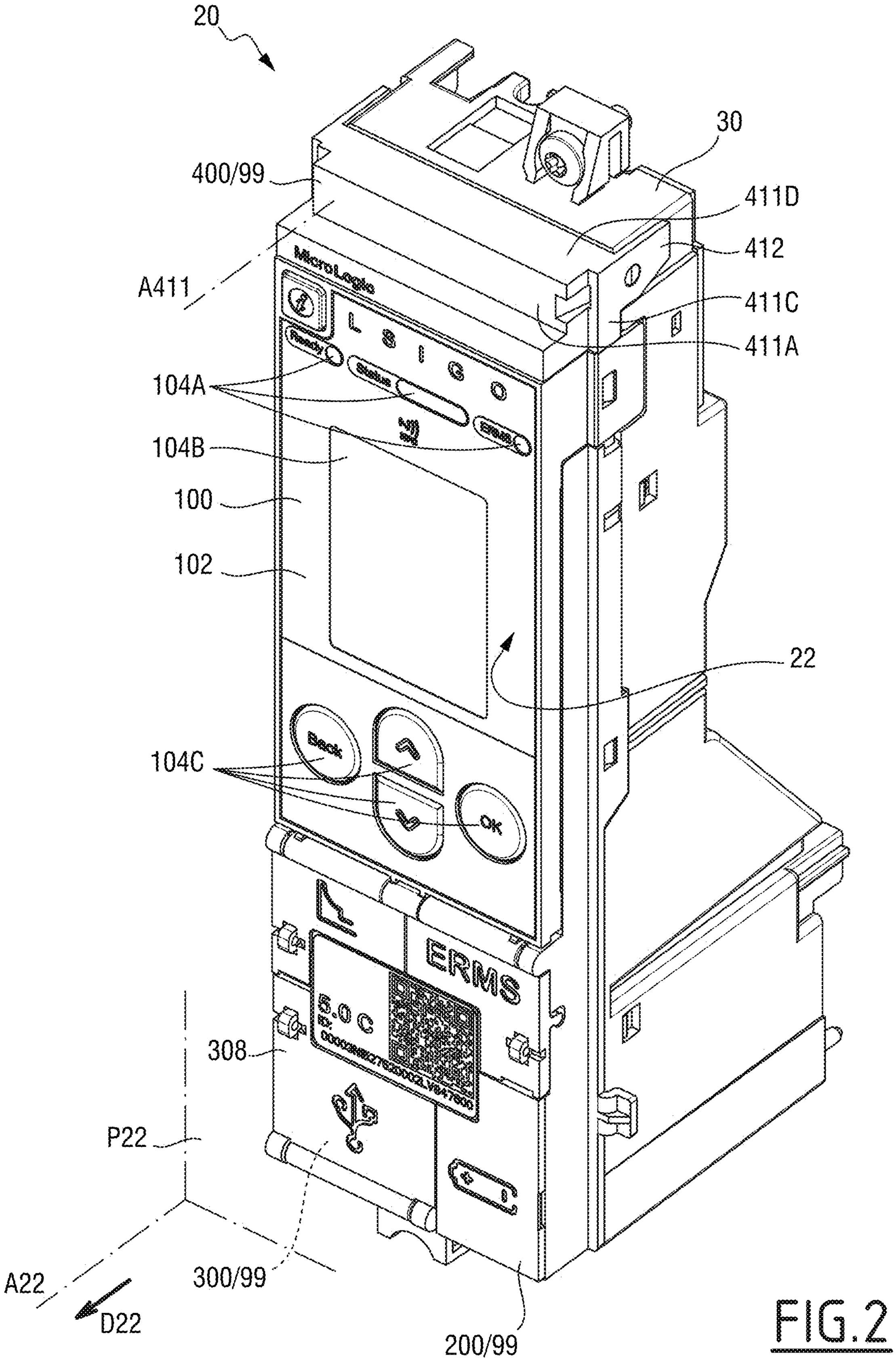
FIG. 2 is a perspective view of the control unit of FIG. 1.
Figure 3:
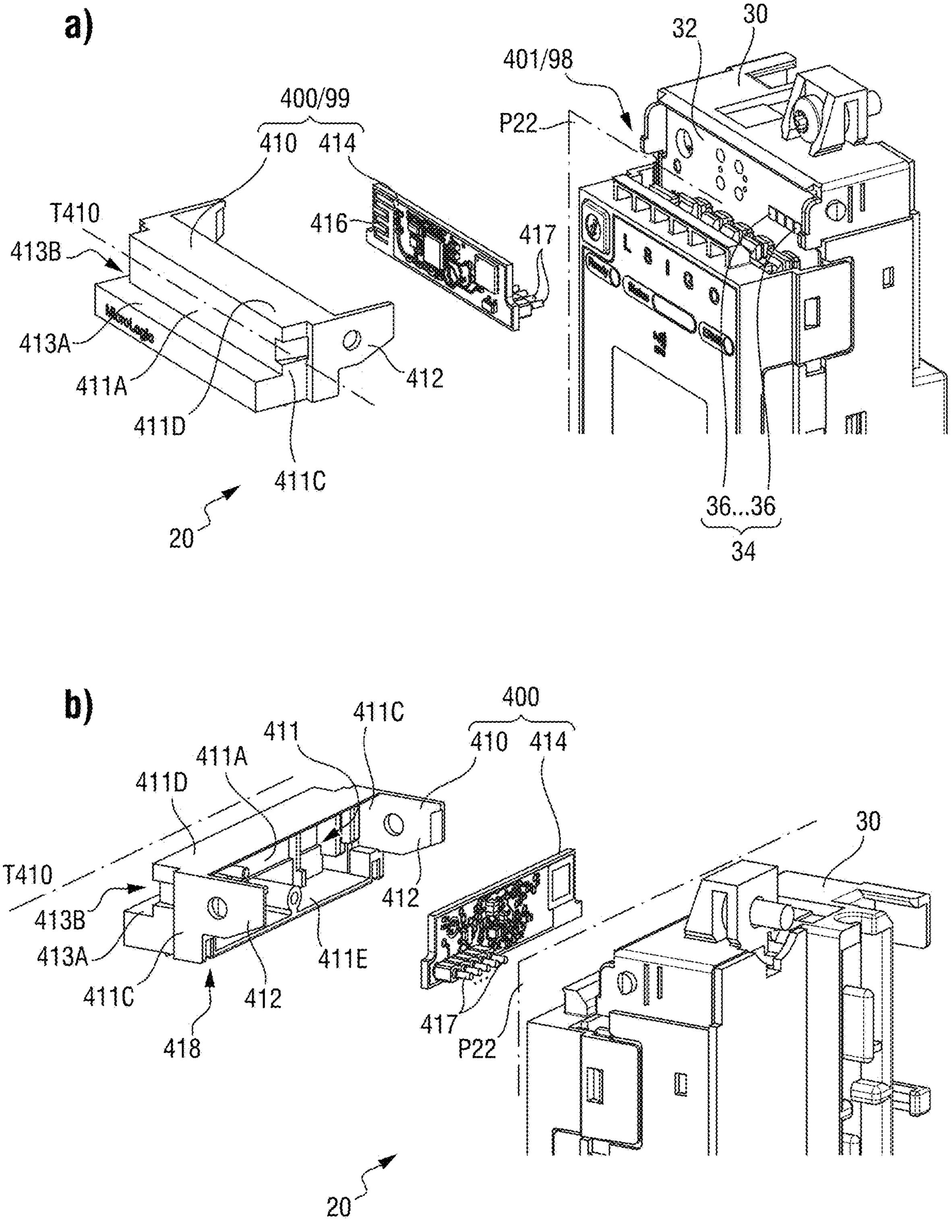
FIG. 3 represents, in two inserts a) and b), a partially exploded perspective view of the control unit of FIG. 1, observed under two different angles of view.
Figure 4:
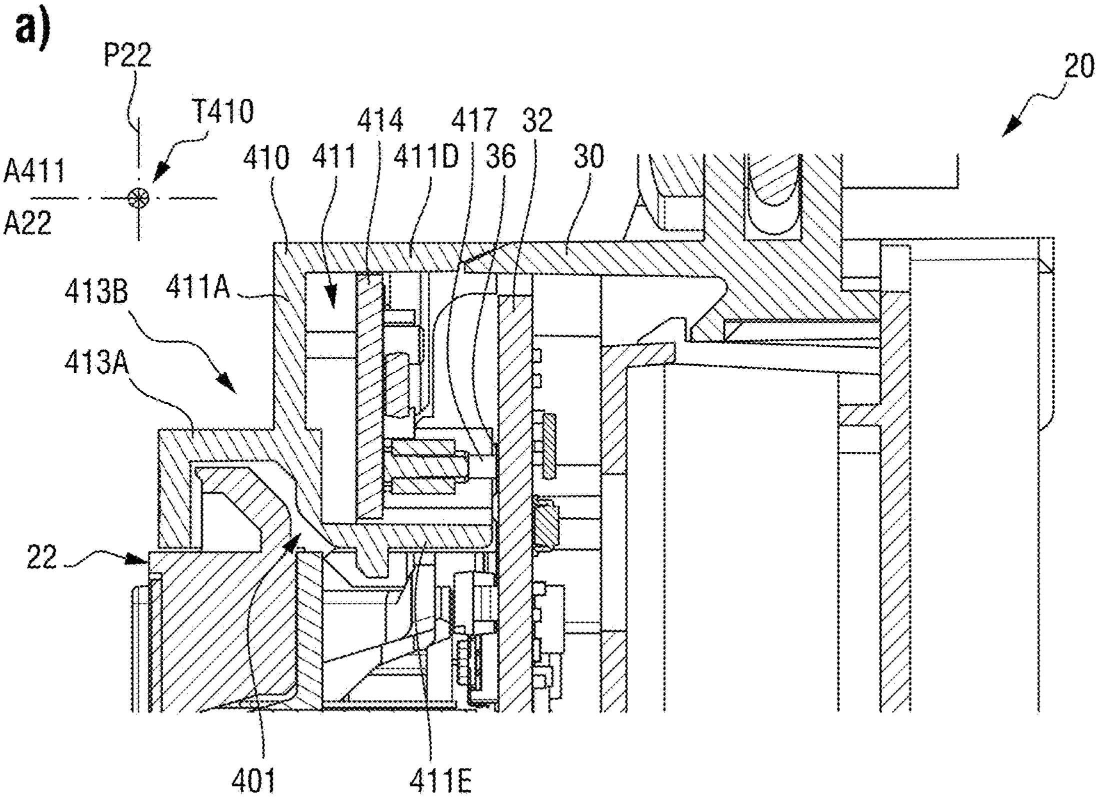
FIG. 4 represents, in two inserts a) and b), a section of a control unit of FIG. 1, represented in two different configurations.
Figure 4:
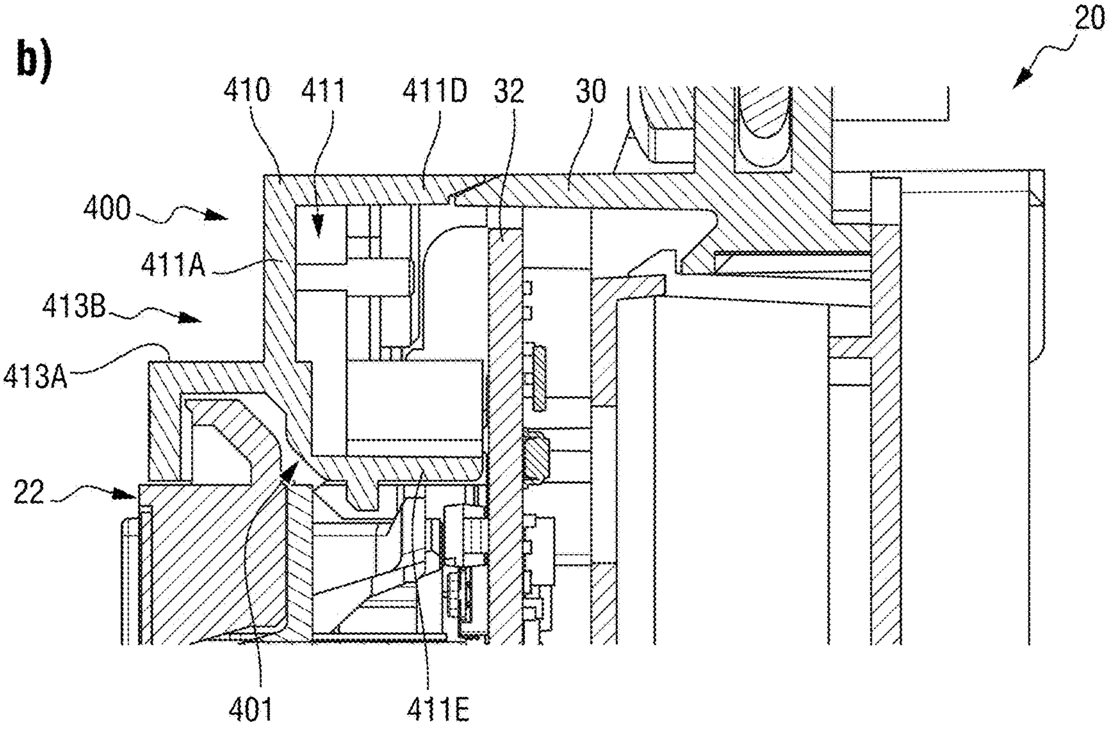

The control unit 20 is now described, with reference to FIGS. 2 to 4.

The control unit 20 comprises a casing 30, which is made of an insulating material, and which forms a receiving volume for various components of the control unit 10. The casing 30, in particular, houses a printed circuit board 32, which is partially visible in FIGS. 3 and 4. The printed circuit board 32 comprises, in particular, a printed circuit and several electronic components such as a microprocessor, etc.

In the illustrated example, the printed circuit board 32 comprises several portions, which are, here, connected to each other by a communication bus. The communication buses are not represented. Optionally, one or more portions of the printed circuit board 32 are flexible. Alternatively, the printed circuit board 32 includes several portions that are not connected to each other by the communication buses.

The casing 30 here includes a front sub-assembly 100. By extension, the front sub-assembly 100 belongs to the control unit 20. The front sub-assembly 100 comprises a central portion 102, which is here configured to receive at least one human machine interface element 104. A human machine interface is also referred to by its acronym HMI. The human machine interface elements 104 are also simply noted as "HMI elements" 104. In the illustrated example, the central portion 102 comprises several HMI elements 104. The HMI elements 104 here include three indicator lights 104A, a transparent portion 104B, through which a screen can be observed, and four buttons 104C. These examples are not limiting, the type, number, and arrangement of the HMI elements 104 can be changed during the design of the front sub-assembly 100.

The front sub-assembly 100 is advantageously assembled to the rest of the control unit 20, in particular to the casing 30, in a reversible manner. It is thus possible to replace the front sub-assembly 100 in case of malfunction. The central portion 102 thus forms a portion of the front face 22 of the control unit 120.

The casing 30 comprises at least one housing 98, here three housings, each housing being provided recessed from the front plane P22 and opening onto the front face 22.

The control unit 20 also comprises at least one functional module 99, here three functional modules 99, each housing being associated with a respective functional module. Each functional module 99 is thus configured to be reversibly received in the associated housing, the functional module 99 under consideration, being in an assembled configuration.

Preferably, the control unit 20 comprises several functional modules 99. In the illustrated example, the control unit 20 comprises three functional modules 99, which are different from each other, and which include a first module 200, which is here a battery module, a second module 300, which is here a wired connection module, and a third module 400, which is here a wireless communication module. The second functional module 300 is here, hidden by a cover 308. Each functional module 99 is associated with a respective housing 98. Each functional module 99 is configured to be reversibly received in the associated housing 98, the functional module 99 being then in an assembled configuration. In the illustrated example, each functional module 99 is configured to be inserted into the corresponding housing 98 according to an insertion movement, which is a movement in translation, parallel to the depth axis A22 and oriented according to a rearward direction, in other words, in a direction opposite to the forward direction D22.

Here, the third communication module 400 will be discussed, the invention may of course be implemented without the other functional modules. The third communication module 400 is also simply called «<communication module 400>. The housing 98 associated with the third communication module 400 is also called communication housing 401.

The casing 30 delimits the communication housing 401, which is provided recessed from the front plane P22, and which opens onto the front face 24. In other words, the communication housing 401 is open according to the forward direction D22. In the illustrated example, the communication housing 401 is arranged on an edge of the front face 24, in other words, the communication housing 401 is also open according to a radial direction to the forward direction D22. In the illustrated example, the communication housing 401 is open toward the top of the control unit 20. The communication housing 401 is thus called "frontal housing."

The printed circuit board 32 comprises a connection zone 34, which comprises several juxtaposed electrical contact pads 36. The connection zone 34 here comprises five aligned contact pads 36. The connection zone 34 is located in the connection housing 401, the printed circuit board 32 here forming a bottom of the connection housing 401.

Each contact pad 36 comprises a flat conductive element substantially located on the surface of the printed circuit board 32, each contact pad 36 being able to be electrically connected to a respective complementary connector 417, belonging to the communication module 400, each complementary connector 417 being in contact with the corresponding contact pad 36. The complementary connectors 417 are detailed later. Advantageously, the contact pads 36 are part of the printed circuit of the printed circuit board 32, in other words, they are manufactured at the same time as the printed circuit board 32.

Each contact pad 36 of the connection zone 34 is located recessed from the front plane P22 and is spaced away from the front plane P22 by a distance, measured according to the depth axis, greater than a predetermined first threshold S1. The first threshold S1 is chosen so that the clearance distance between each contact pad 36 and the front plane P22 is greater than a class 2 isolation distance under a voltage greater than 690 V, the clearance distance and the isolation distance in class 2 being according to the IEC 947-1:2019 standard. Schematically, the clearance distance between two points is the shortest path between these two points, while bypassing any obstacles.

Preferably, the first threshold S1 is greater than or equal to 14 mm.

The communication module 400 is now described.

The communication module 400 is configured to be received in the communication housing 401 in an assembled position of the communication module 400, the control unit 20 being then in an assembled configuration. The communication module 400 comprises a body 410, which is made of an electrically insulating material.

The body 410 is represented in isolation in FIG. 3, and in an assembled configuration in FIG. 2. With reference to FIG. 9 where the body 410 is visible in section, the body 410 comprises a main portion delimiting a cavity 411, which is open according to a rear direction of the body 410, the rear direction being opposite to the forward direction D22 when the communication module 400 is assembled to the casing 30. Optionally, the communication module 400 also advantageously comprises a communication card 414, which is configured to be received in the cavity 411. The communication card advantageously comprises an antenna 416, and one or more examples of the complementary contacts 417. The complementary contacts 417 here are pins, preferably telescopic pins—also called pogo-pins, each pin 417 being configured to be connected to a respective contact pad 36 according to a movement comprising a translation component.

The body 410 here has an elongated shape and extends parallel to the transverse axis T410 of the body 410, as illustrated in FIG. 5. When the body 410 is assembled to the casing 30, the transverse axis T410 is parallel to a transverse axis of the casing 30, and by extension to the control unit 20, the transverse axis being parallel to the front plane P22.

The body 410 presents, in section according to a plane orthogonal to the transverse axis T410, in other words, a transverse section, a section substantially constant. The body 410 comprises an proximal wall 411A, which is located at the user side when the connection module 300 is in an assembled position, two lateral walls 411C, which extend orthogonally to the transverse axis T410, and which are connected to each other, by the proximal wall 411A. The body 410 also comprises an upper wall 411D and a lower wall 411E, which are parallel to each other and which are connected to each other, on the one hand, by the proximal wall 411A and, on the other hand, by the lateral walls 411D. The proximal wall 411A, is here plane and generally orthogonal to a main axis A411. When the communication module 400 is in the configuration assembled to the casing 30, the main axis A411 is parallel to the depth axis A22. The proximal walls 411A, the lateral walls 411C, and the upper wall 411D and the lower wall 411E together form an envelope which delimits the cavity 411. The lateral walls 411C the upper wall 411D, and the lower wall 411E together form a peripheral wall of the envelope, the peripheral protruding from the proximal wall 411A. The cavity 411 opens from the envelope of the communication module 400 through a distal opening 418, which is located in a proximal wall according to the main axis A411.

Advantageously, the peripheral wall presents a continuous contour around the main axis A411.

When the communication module is in the assembled configuration, the distal opening 418 is oriented toward the connection zone 34. The cavity 411 masking the contact pads 36 according to the depth axis A22, while the creepage distance from each contact pad 36 to the front plane P22 is greater than a predetermined second threshold S2, the second threshold being greater than the first threshold S1. Preferably, the second threshold S2 is greater than the isolation distance of class 2 as defined in the IEC 947-1:2019 standard. Preferably, the second threshold S2 is equal to 20 mm.

The body 410 also comprises attachment means 412 to hold the communication module 400 in the assembled position. The attachment means 412 are here two elastic clips, which extend here toward the rear from each of the lateral faces 411C. The attachment means 412 are advantageously reversible, so that a user can extract the communication module 400 from the communication housing 401, for example to replace the communication module 400 in case of malfunction.

Advantageously, the proximal wall 411A is located recessed from the front plane P22, while the body 410 also comprises a projection 413A, which extends from the proximal wall 411A according to the forward direction D22, the proximal wall 411A and the projection together delimiting a recess 413B of the body 410, and by extension of the third communication module 400. The recess 413B is thus located recessed from the front plane.

The projection 413A here presents, in cross-section, a continuous L-shaped profile. The projection 413A is located at a distance from an edge of the junction between the proximal wall 411A and the upper wall 411D, so that the recess 413B is open both toward the front and toward the top of the control unit 20 when the body 410 is in the assembled position on the casing 30.

When the control unit 20 is received in the receptacle of the breaker unit 16 and the cover 18 is mounted on the breaker unit, the cover 18 covers the recess 413B, so as to prevent the removal of the communication module, from the rest of the control unit 20, as illustrated in FIG. 5. More precisely, an edge 19A of the window 19 of the cover 18 cooperates with the recess 413B, so as to limit the movements of the body 410 relative to the casing 30 of the control unit 20, in particular the movements in translation toward the front or toward the top. The communication module 400 is thus held assembled to the housing 30.

It is thus understood that when the control unit 20 is received in the receptacle of the breaker unit 16, as long as the cover 18 is assembled to the breaker unit 16, the cover prevents both the removal of the communication module 400 from the control unit 20, and the removal of the control unit 20 from the breaker unit 16.

The complementary contacts 417 are here pins 417, preferably telescopic pins—also called "pogo-pins"—, each pin 417 being configured to be connected to a respective contact pad 36 according to a movement in translation. Advantageously, when the communication card 414 is received in the cavity 411, only the complementary contacts 417 protrude from the cavity 411, to the outside of the envelope, by the distal opening 418. The telescopic pins 417 allow dimensional variations to be accommodated when the communication module 400 is in the assembled position.

When the communication card 414 is received in the cavity 411, the antenna 416 is advantageously located facing the proximal wall 411A in such a manner as to favor the transmission of electromagnetic waves emitted or received by the antenna 416.

When the communication module 400 is received in the corresponding communication housing 401, the envelope at least partially closes the associated communication housing 401, so that a creepage distance from each contact pad 36 to the front plane P22 is greater than a class 2 isolation distance under a voltage greater than 690 V, the creepage distance being according to the IEC 947-1:2019 standard. The class 2 isolation distance is obtained both when the communication card 414 is present and when the communication card is absent. It is thus possible to add the communication card, according to user needs, to a control unit 20 from which it was initially absent, and this even after the commissioning of the control module 20 and the circuit breaker 10, without changing the safety level of the circuit breaker 10.

In particular, when the envelope of the communication module 400 is in the assembled position, the lower wall 411E extends in the direction of the printed circuit board 32, one end of the lower wall 411E being located facing the printed circuit board.

The embodiments and alternatives mentioned above can be combined with each other to generate new embodiments of the invention.

The invention claimed is:

1. A control unit for an electrical circuit breaker, the control unit comprising:

a front face, which presents a generally flat shape and is geometrically carried by a front plane, the front face being orthogonal to a depth axis and defining a forward direction oriented toward a user when the control unit is in a normal use configuration;

a casing, which is made of an insulating material and which delimits a housing that is recessed from the front plane and opens onto the front face;

a printed circuit board, which comprises at least one connection zone with one or more juxtaposed electrical contact pads, the connection zone being located in the housing;

a communication module, which comprises an envelope delimiting a cavity, the cavity being configured to receive a wireless communication card, the wireless communication card comprising an antenna and complementary connectors, the envelope being made from an electrically insulated material and being configured to be received in a reversible manner in the housing, the envelope of the communication module being in an assembled position;

wherein:

each contact pad is located recessed from the front plane and is spaced away from the front plane by a distance, measured according to the depth axis, greater than a predetermined first threshold;

the first threshold is chosen so that a clearance distance between each contact pad and the front plane is greater than a class 2 isolation distance under an voltage greater than 690 V, the clearance distance and the class 2 isolation distance being according to the IEC947-1:2019 standard, and when the envelope is in the assembled position, the envelope at least partially closes the housing, so that a creepage distance between each contact pad and the front plane is greater than a predetermined second threshold, the second threshold being equal to the class 2 isolation distance under a voltage greater than 690 V, according to the IEC947-1:2019 standard.

2. The control unit according to claim 1, wherein:

the first threshold is greater than or equal to 14 mm.

3. The control unit according to claim 1, wherein:

each envelope comprises a proximal wall, which is generally orthogonal to a main axis, and a peripheral wall, which extends and projection from the proximal wall and which presents a continuous contour around the main axis, the proximal wall and the peripheral wall together delimiting the cavity of the envelope, wherein the cavity opens from the envelope through a distal opening located opposite the proximal wall according to the main axis; and when the communication module is in an assembled configuration, the main axis is parallel to the depth axis while the distal opening is oriented toward the corresponding connection zone, the cavity masking the contact pads according to the depth axis.

4. The control unit according to claim 1, wherein:

the second threshold is equal to 20 mm.

5. The control unit according to claim 1, wherein:

the communication module comprises the communication card, which is received in the cavity.

6. The control unit according to claim 5, wherein:

the communication module comprises at least one complementary contact, which is made of metal, which is partially received in the cavity, and which protrudes outside the envelope through the distal opening; and each complementary contact is configured to be reversibly connected to a respective electrical contact pad associated with the corresponding housing when the communication module is in an assembled configuration.

7. An electrical circuit breaker, comprising:

a breaker unit, comprising at least one breaker device and an actuator, the breaker device being triggerable by means of the actuator;

one example of a control unit according to claim 1, wherein:

the breaker unit provides a receptacle, which opens onto the frontal face of the breaker unit; and the control unit is received in the receptacle of the breaker unit, so that the front face of the control unit is aligned with the frontal face of the breaker unit.

8. The electrical breaker according to claim 7, wherein:

the breaker unit, comprises a cover which is removable from the rest of the breaker unit, which is made from an electrically insulating material in which defines a portion of the frontal face of the breaker unit;

the communication housing is a frontal housing, which is arranged at the edge of the front face, while the communication module presents a recess, which is located behind the front plane; and when the control unit is received in the receptacle and the cover is mounted on the breaker unit, the cover partially closes the recess in such a manner as to prevent the communication module from being removed from the rest of the control unit.

* * * * *